United States Patent [19]

Greene

[11] 3,943,764
[45] Mar. 16, 1976

[54] SAILBOAT STEERING INDICATOR SYSTEM

[75] Inventor: Leonard M. Greene, Chappaqua, N.Y.

[73] Assignee: Safe Flight Instrument Corporation, White Plains, N.Y.

[22] Filed: Feb. 12, 1975

[21] Appl. No.: 549,381

[52] U.S. Cl. ........ 73/178 R; 114/144 C; 235/150.2
[51] Int. Cl.² ........................................ G01C 21/00
[58] Field of Search ......... 73/178 R, 180, 188, 189; 114/144 E, 144 C; 235/150.2; 244/77 E, 77 A; 318/588

[56] References Cited
UNITED STATES PATENTS

| | | | |
|---|---|---|---|
| 3,361,392 | 1/1968 | Doniger et al. | 244/77 A |
| 3,446,070 | 5/1969 | Hickox | 73/189 |
| 3,685,478 | 8/1972 | Casani et al. | 114/144 E |
| 3,727,457 | 4/1973 | Gregory | 73/188 |
| 3,852,650 | 12/1974 | Masuzawa et al. | 114/144 E X |

*Primary Examiner*—Trygve M. Blix
*Assistant Examiner*—Stephen G. Kunin
*Attorney, Agent, or Firm*—Edward A. Sokolski

[57] ABSTRACT

An electrical signal in accordance with the direction of the wind relative to the heading of a sailboat is generated by means of a wind direction sensor and a transducer. This signal is fed to a summing device where it is summed in opposite polarity relationship with a signal in accordance with changes in rudder position from its neutral position, signals representing a steady state condition of the rudder being "washed out." The output of the summing device which represents the apparent wind direction (relative to boat heading) as modified by a change of rudder signal provides an "apparent wind track" error signal which is used to drive a servo motor. The output of the motor is coupled to a gear, this gear driving an indicator which provides a reading which can be used by the helmsman in reaching a desired wind track. The output of the gear is also used to drive the transducer means so as to zero its output to complete the servo loop formed. Further, a signal in accordance with the speed of rotation of the motor and which thus represents rate of rudder change and/or heading change is used to counteract washout of the rudder signal, during turning of the boat. In this manner a steering indicator is provided, which enables the helmsman to efficiently establish a desired heading relative to the apparent wind direction, by turning the helm (rudder) to effect an indication of this desired heading and then trimming the helm to maintain this indication as the boat comes around.

13 Claims, 8 Drawing Figures

SAILBOAT STEERING INDICATOR SYSTEM

This invention relates to steering indicators for sailboats and more particularly to a director type indicator which allows the helmsman to pick a desired wind angle, turn the helm to effect an indication of this angle, and then gradually trim the helm to hold this indication as the boat comes around. At this time, the rudder will be neutral and the apparent wind angle will be as indicated.

In the operation of a sailboat it is desirable to steer to and hold headings at a predetermined constant angle with respect to the apparent wind direction in the presence of changing sea and wind conditions. Devices of the prior art for achieving this end result generally comprise an indicator device coupled to a wind vane which provides an indication of the apparent wind direction as determined by the vane position relative to boat heading. This type of an indicator has no way of anticipating changes in heading which are about to occur due to rudder changes. Thus, in steering to attain a desired heading relative to apparent wind direction, the helmsman will often tend to overshoot or undershoot the desired heading.

The present invention overcomes this shortcoming of prior art wind indicators by modifying the signal developed from the wind vane with a properly conditioned signal representing rudder changes from the neutral rudder position. The signal fed to the indicator thus provides a director type indication which anticipates changes in relative wind angle which will occur in response to rudder changes. This enables the helmsman to use the indicator to smoothly come to the desired heading in an efficient manner without undershooting or overshooting the desired course.

It is therefore an object of this invention to facilitate the steering of a sailboat to maintain a predesired heading relative to apparent wind direction.

It is another object of this invention to avoid overshoot and understood and to facilitate a smooth heading change in steering a boat to come to a proper heading relative to apparent wind direction.

Other objects of this invention will become apparent as the description proceeds in connection with the accompanying drawings, of which:

Figure 1:
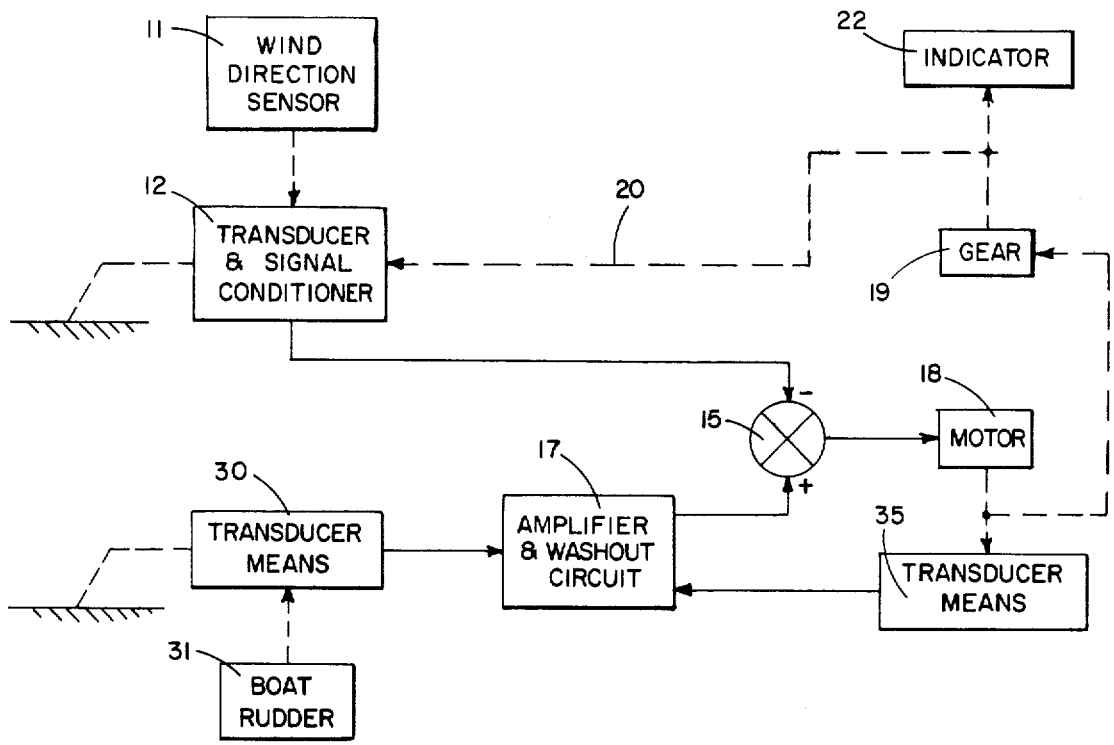
FIG. 1 is a functional block diagram illustrating the basic operation of the system of the invention.

Referring now to FIG. 1, the basic operation of the system of the invention is schematically illustrated. The apparent direction of the wind relative to boat heading is detected by wind direction sensor 11 which may comprise a wind vane. This signal is mechanically coupled to transducer and signal conditioner means 12 which, as to be explained in connection with the preferred embodiment, may comprise a synchro transmitter and control transformer which converts the signal to electrical form and a demodulator and function generator which condition this electrical signal. The output of transducer and signal conditioner means 12 which is an electrical signal representing apparent wind direction relative to boat heading is fed to summing device 15.

Let us first assume that the signal being fed to summing device 15 from amplifier and washout circuit 17 is zero. Under such conditions, the output of the summing device will represent the output of transducer and signal conditioner means 12. This signal is used to drive motor 18 which in turn drives gear 19. The output of gear 19 which provides 1° of shaft rotation for each 1° of shaft rotation of wind direction sensor 11 is coupled by linkage 20 to transducer and signal conditioner means 12 to null the servo loop.

When the output of gear 19 has rotated to correspond to the rotation of wind direction sensor 11, the output of transducer and signal conditioner means 12 will be cancelled out by virtue of the mechanical signal provided through linkage 20. The output of gear 19 is fed to indicator 22 which provides an indication of the wind direction relative to boat heading.

As described thus far, the system is similar to prior art wind indicators which provide nothing more than an indication in accordance with the position of the wind vane. The present system, however, additionally incorporates means for providing a signal representing rudder changes which is used to modify the wind vane signal. This is provided as follows:

Transducer means 30 generates an electrical signal in accordance with displacement of boat rudder 31 to the left and right of its neutral position. The output of transducer means 30 is fed to amplifier and washout circuit 17. The amplifier and washout circuit effectively "washes out" signals representing the steady state position of the rudder, only passing the signals representing changes of rudder position. Amplifier and washout circuit 17 also includes a filter for filtering out small relatively rapid rudder changes. The output of amplifier and washout circuit 17 is fed to summing device 15 in a polarity opposite to that of the signal received by the summing device from transducer and signal conditioner means 12 (such as to add to the signal where the rudder change is such as to cause the apparent wind angle to increase, and vice versa). Thus, the indicator signal is modified to anticipate wind angle changes in response to rudder changes. Accordingly, when the rudder position is being changed, i.e., the helmsman is steering the boat to a new heading, indicator 22 indicates an anticipated wind track for optimum steering to the desired course rather than the apparent wind track. However, when the boat rudder has been steadied, the indicator shows the apparent wind track. Transducer means 35, which may comprise an electrical generator coupled to the output shaft of motor 18, provides an output signal having an amplitude in accordance with the speed of rotation of the motor. Thus, when the error signal in the servo loop is high and motor 18 is rotating, a signal is fed from transducer means 35 to amplifier and washout circuit 17, this signal being fed to such circuit in a manner such as to counteract washout in the circuit, i.e., to increase the response of the circuit to lower rate changes in rudder position.

Figure 2:
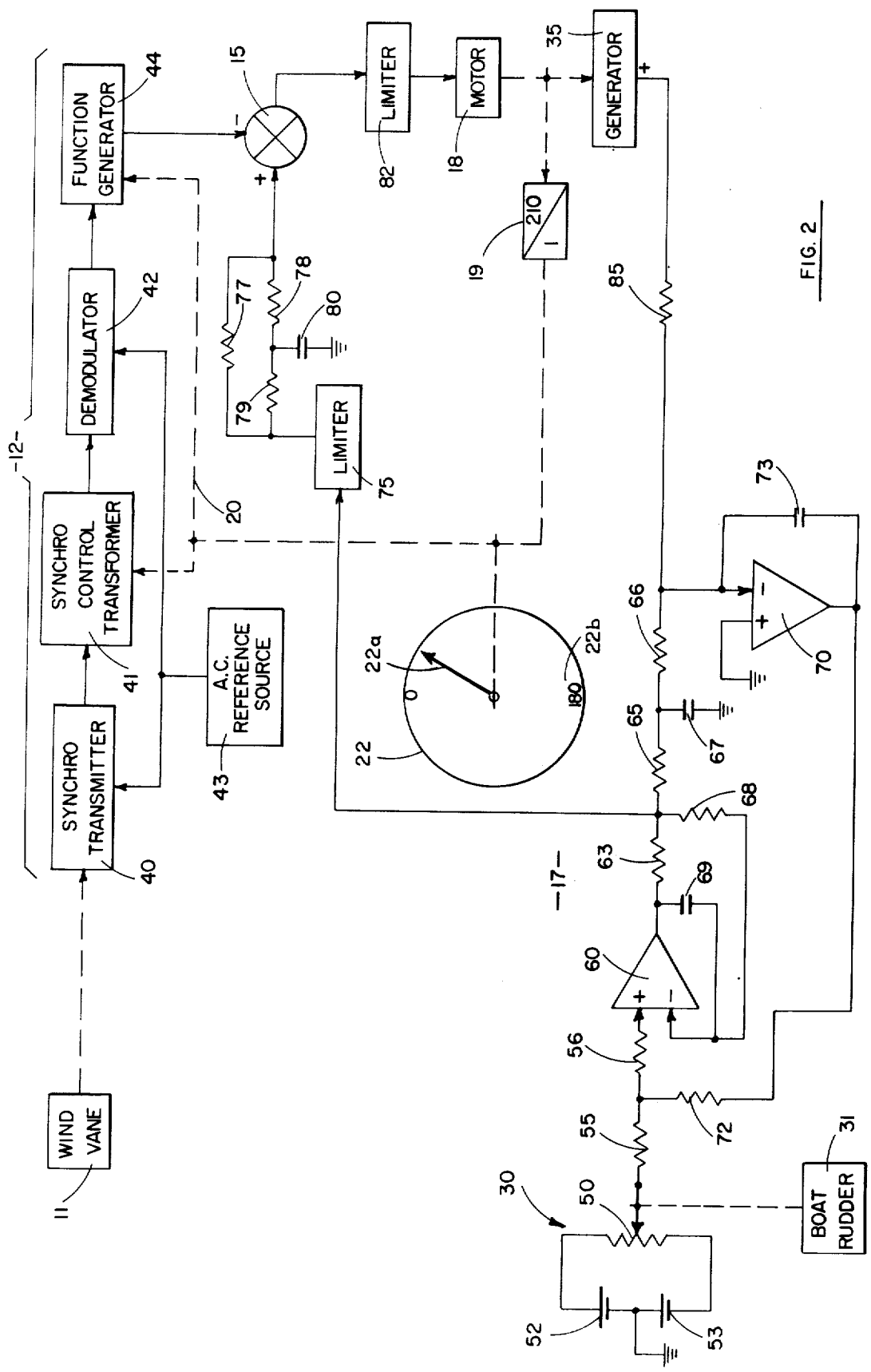
FIG. 2 is a functional schematic drawing illustrating the preferred embodiment of the invention.

Referring now to FIG. 2, a preferred embodiment of the invention is schematically illustrated. A signal in accordance with wind direction relative to boat heading is provided by wind vane 11, this signal being transduced to electrical form by means of synchro transmitter 40 which receives an AC reference signal from AC reference source 43. The output of synchro transmitter 40 is fed to synchro control transformer 41. The output of the control transformer which represents the servo "error" signal is fed to demodulator 42. Demodulator 42 is a synchronous demodulator which receives a reference signal from AC reference source 43 and converts the servo error signal to DC form. It is to be noted at this point that synchro control transformer 41 receives a mechanical rotational output from gear 19 which signal represents the angular position shown on indicator 22 in response to the servo drive. Thus, the output of the control transformer represents the differential (or servo error) between the output of synchro transmitter 40 and the mechanical feedback received from the indicator drive.

Figure 3:
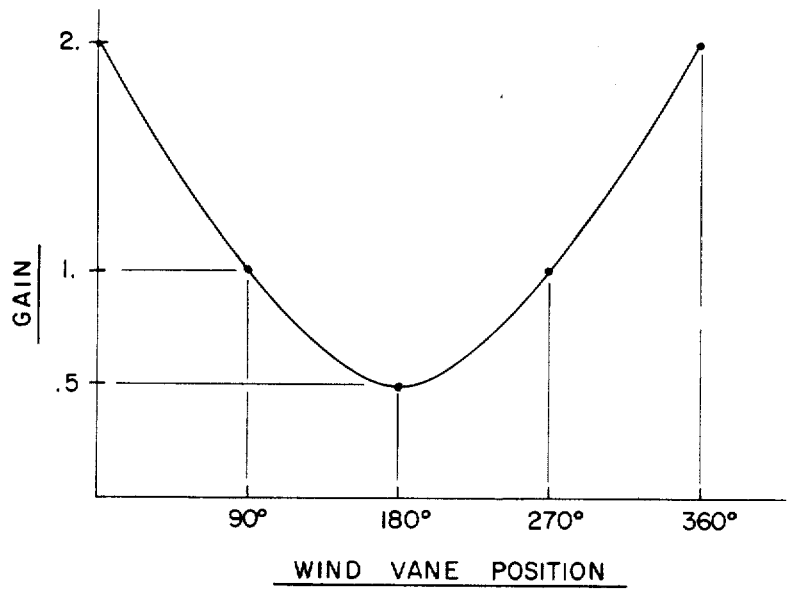
FIG. 3 is a graph showing the characteristics of a function generator utilized in the preferred embodiment.
Figure 5:
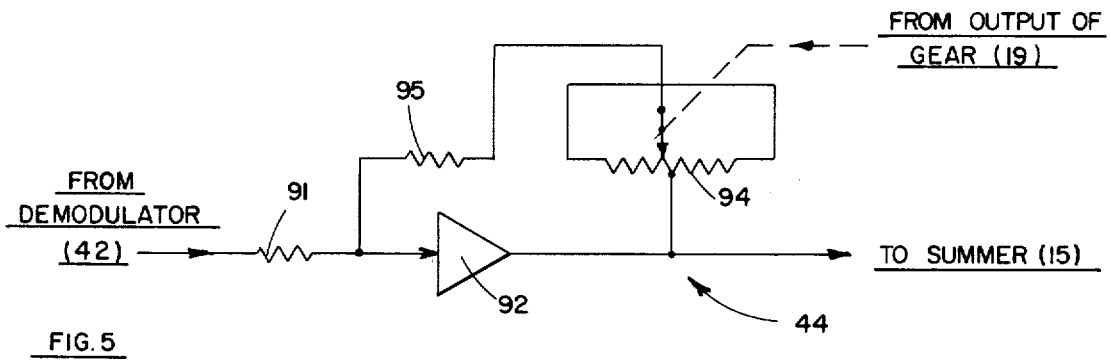
FIG. 5 is a schematic drawing of a function generator which may be utilized in the preferred embodiment.

The output of demodulator 42 is a DC signal and is fed to function generator 44 which operates to control the amplitude of the signal as a function of wind vane position. The characteristics of function generator 44 are illustrated in FIG. 3. As can be seen in FIG. 3, function generator 44 operates to provide maximum gain with the wind vane at 0°, i.e., where boat heading is into the wind, and minimum gain with the wind vane at 180°, i.e., where boat heading is directly away from the wind. The signal is conditioned in this manner so that when the boat is heading away from the wind, flopping of the wind vane one way or the other, due to the low apparent wind velocity, will not overly affect the indicator signal. A function generator for use in the preferred embodiment is schematically illustrated in FIG. 5 and will be described in detail in connection with this figure further on in the specification. The output of function generator 44 is fed to summing device 15.

Boat rudder 31 is coupled to the arm of potentiometer 50. The ends of potentiometer 50 are connected to power sources 52 and 53 which are connected in series, their commonly connected terminals being grounded. Potentiometer 50 thus has a potential which is positive with respect to ground connected on one end thereof and a potential which is negative with respect to ground connected on the other end thereof. The arm of the potentiometer is pre-adjusted so that a zero potential appears thereat when boat rudder 31 is in its center position. Rudder positions in one direction from center will thus result in a positive voltage at the potentiometer arm, while rudder positions in an opposite direction from center will produce a negative voltage.

The signal at the arm of potentiometer 50 is fed through resistors 55 and 56 to amplifier 60. Resistor 68 and capacitor 69 are utilized to provide feedback to amplifier 60 to stabilize the operation thereof. The output of amplifier 60 is fed through resistor 63 to a low pass filter formed by resistors 65 and 66 and capacitor 67, this filter operating to filter out high frequency components of the signal representing small rapid rudder changes. The output of the low pass filter is fed to amplifier 70. Amplifier 70 has a capacitor 73 connected between the input and output thereof and operates as a Miller integrator having a time constant which may be of the order of 7–10 seconds. The output of amplifier 70 is fed as a negative feedback signal through resistors 72 and 56 to the input of amplifier 60. This negative feedback circuit operates to effectively wash out steady state signals such that the output of amplifier 60 effectively represents changes of rudder position such that once a steady rudder position has been reached, the amplifier no longer has an output signal.

The output of amplifier 60 is fed to limiter 75 which provides positive and negative limiting of the signal thereby to prevent a servo run-away condition. The output of limiter 75 is fed through the low pass filter formed by resistors 77-79 and capacitor 80 to summing device 15.

The output of summing device 15 which represents the wind vane signal as modified by the conditioned rudder signal is fed to limiter 82 which limits the signal fed to motor 18 and therefore the maximum motor speed. This makes the indicator insensitive to wind vane fluctuations. The DC signal drives motor 18, the drive shaft of the motor being coupled to 210/1 gear 19. Gear 19 is coupled to indicator dial 22a of indicator 22.

Figure 4:
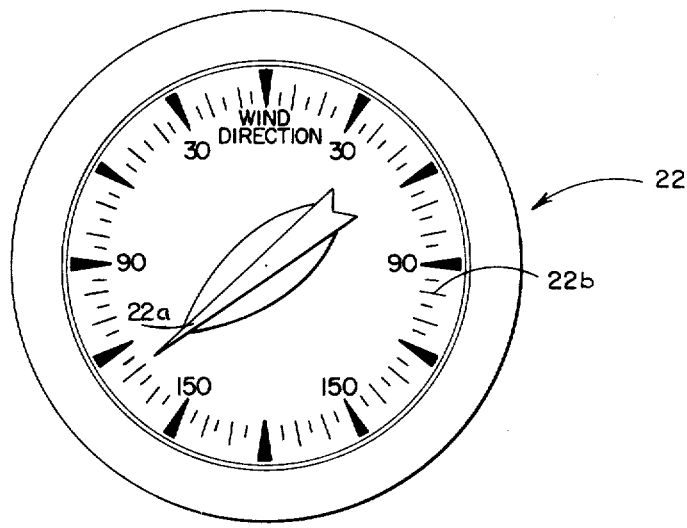
FIG. 4 is a pictorial illustration of an indicator dial which may be utilized in the preferred embodiment.

Referring now to FIG. 4, the indicator dial includes a pointer 22a which operates in conjunction with scale 22b and indicates wind tracks 0°–180° to the left and right of boat heading.

The drive shaft of motor 18 is coupled to drive DC generator 35. Generator 35 thereby provides a DC signal output which is a direct function of the speed of rotation of the motor. The DC output of generator 35 is fed through resistor 85 to the input of amplifier 70 in inverse polarity relationship to the amplifier input representing rudder changes, so as to effectively "buck" the washout signal. The purpose of this feedback is to defeat the washout if the boat is turning so that the motor is turning the indicator as the heading is changing, and the rudder is being moved to the trim position.

Referring now to FIG. 5, a function generator which may be utilized in the preferred embodiment is schematically illustrated. The output of demodulator 42 is fed through resistor 91 to amplifier 92. Negative feedback is fed from the output of amplifier 92 to the input thereof through potentiometer 94, the ends of the potentiometer being connected together, with the center tap of the potentiometer being connected to the output of the amplifier and the arm of the potentiometer being connected through resistor 95 to the input of the amplifier. The arm of the potentiometer is mechanically coupled to the output of gear 87. The potentiometer is connected so that it has the non-linear (curved) resistance characteristics over the travel range of its arm as shown in FIG. 3, the precise characteristics of the potentiometer being non-critical. Thus, it can be seen that at the center tap position which corresponds to the 180° wind vane position that there is maximum negative feedback, to minimize amplifier gain while with the potentiometer arm at either of the opposite ends of its travel, minimum negative feedback is provided to make for highest amplifier gain.

Figure 6:
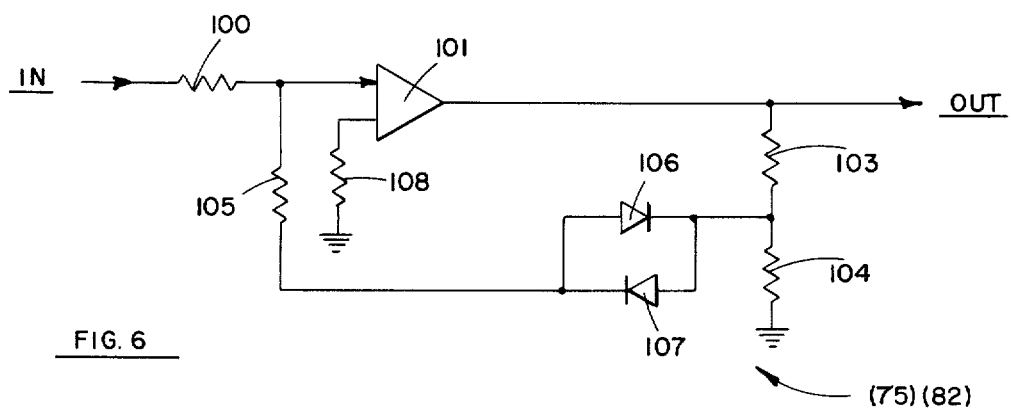
FIG. 6 is a schematic drawing of a limiter which may be utilized in the preferred embodiment.

Referring now to FIG. 6, a limiter circuit which may be utilized in implementing limiters 75 and 82 is schematically illustrated. This limiter circuit provides both positive and negative limiting. Input signals are fed through resistor 100 to amplifier 101. The output of the amplifier is fed to the voltage divider comprising resistors 103 and 104. A negative feedback signal is fed from the junction between resistors 103 and 104 through diodes 106 and 107 and resistor 105 to the input of amplifier 101. Diodes 106 and 107 may be silicon diodes which start to conduct at 0.6 volts. Thus, when the voltage at either one or the other of the diodes is greater than plus or minus 0.6 volts, negative feedback is provided to the amplifier, this feedback holding the output of the amplifier constant with increases in the input voltage thereto. Resistor 108 is used to provide self bias for the amplifier.

Figure 7:
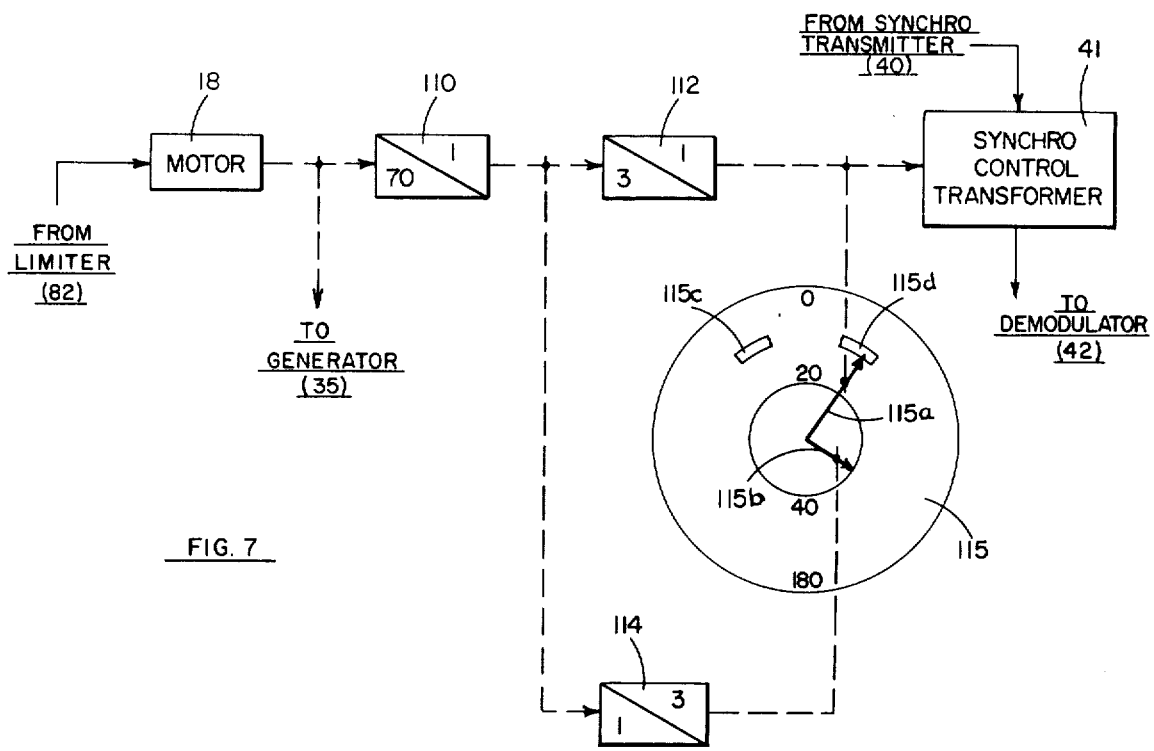
FIG. 7 is a schematic drawing of an alternative gear and indicator arrangement which may be utilized in the system of the invention.
Figure 8:
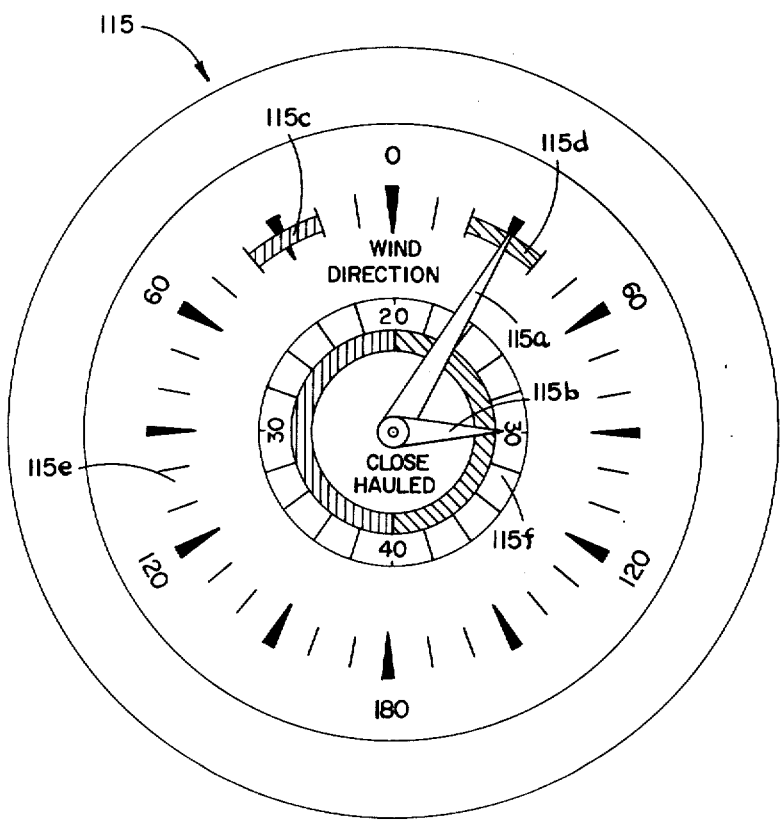
FIG. 8 is a pictorial illustration of an indicator dial which may be used with the indicator arrangement of FIG. 7.

Referring now to FIGS. 7 and 8, an alternative gear and indicator arrangement which may be utilized in the system of the invention is illustrated. It is to be noted that this arrangement can be used to equal advantage with systems other than that of the present invention. The indicator arrangement of FIGS. 7 and 8 provides a vernier indication when the boat is "close-hauled", i.e., when the boat is steered to an apparent wind angle between 20° and 40° in which range accurate steering is required since even a 1° heading change makes a large change in headway. This indicator arrangement provides a second indicator dial which more accurately indicates apparent wind direction for use when such wind direction is between 20° and 40°, either to the port or starboard of boat heading.

As illustrated in FIG. 7, in implementing this type of indication, motor 18 is used to drive 70/1 gear 110, which in turn drives 3/1 gear 112 and 1/3 gear 114. The output of gear 112 drives main indicator pointer 115a of indicator 115, this indicator pointer operating in the same manner as pointer 22a of indicator 22 described in connection with FIGS. 2 and 4. Gear 114 drives pointer 115b, the gear ratios between pointers 115a and 115b being such that pointer 115b makes nine revolutions for each one revolution of pointer 115a. Thus, when the apparent wind direction is between 20° and 40° to the port or starboard of boat heading, as indicated by the presence of pointer 115a opposite specially marked areas 115c or 115d, a vernier or "fine" indication of the apparent wind direction is provided to enable more accurate steering by the helmsman. While pointer 115b will rotate other than during a close-hauled condition, precise indication by pointer 115 b as to the apparent wind direction is only provided in these ranges. A closed-hauled condition is indicated by the presence of pointer 115a opposite marked areas 115c or 115d. It is to be noted that indicator pointers 115a and 115b are always in the same half sector of the indicator when the apparent wind direction is in the predetermined close-hauled range.

Referring now to FIG. 8, a preferred embodiment of indicator 115 is shown. As can be seen, pointer 115a indicates the apparent wind direction for all directions on dial scale 115e. Pointer 115b only indicates readings between 20° and 40° in conjunction with dial scale 115f. The existence of a close-hauled condition is indicated by means of marked areas 115c and 115d so that the operator can readily ascertain when the readings provided by pointer 115b are valid. This display thus provides an easy to read indicator for the helmsman for use in accurately steering the boat when in the close-hauled condition.

The system of the invention thus provides means for facilitating the steering of a sailboat to obtain a desired wind track and for maintaining this track.

While the invention has been described and illustrated in detail, it is to be clearly understood that this is intended by way of illustration and example only and is not to be taken by way of limitation, the spirit and scope of this invention being limited only by the terms of the following claims.

I claim:
1. A sailboat steering indicator system comprising:
    means for sensing the apparent wind direction relative to boat heading and providing a mechanical signal in accordance therewith,
    means for converting said mechanical signal to an electrical signal,
    means for generating an electrical signal in accordance with changes in boat rudder position from its neutral position and including means for effecting washout of signal components representing steady rudder positions,
    means for summing said electrical signals in opposite polarity relationship, the signal in accordance with apparent wind direction being modified to anticipate apparent wind angle changes in response to rudder changes, and
    means for providing a wind track reading in accordance with the output of said summing means for use in guiding the steering of said sailboat to a desired heading relative to wind direction.
2. The system of claim 1 wherein said means for providing a wind track reading in accordance with the output of said summing means includes means for converting the output of said summing means to a mechanical signal and indicator means responsive to said mechanical signal.
3. The system of claim 2 wherein said means for converting the output of said summing means to a mechanical signal comprises a motor driven by the output of said summing means and a gear driven by the motor, the gear driving said indicator means.
4. In a sailboat steering indicator system,
    means for providing a mechanical signal in accordance with wind direction relative to boat heading,
    means for converting said mechanical signal to an electrical signal,
    transducer means coupled to the boat rudder for generating an electrical signal in accordance with departures of the boat rudder from its center position,
    amplifier-washout circuit means connected to receive the output of said transducer means for amplifying the electrical signal in accordance with rudder departures and washing out steady state components of said signal,
    means for summing the electrical signal outputs of said converting means and said amplifier-washout circuit means in opposite polarity relationship,
    means for converting the output of said summing means to a mechanical signal and
    indicator means for providing a wind track reading in response to said mechanical signal for use in guiding the steering of said sailboat to a desired heading relative to wind direction.
5. The system of claim 4 wherein said means for converting the output of said summing means to a mechanical signal comprises a motor driven by the output of said summing means and a gear driven by the motor, the gear driving said indicator means.
6. The system of claim 5 and further including an electrical generator driven by said motor, said generator having an output voltage in accordance with the speed of rotation of said motor, the output of said gen- erator being fed to said amplifier-washout circuit in a polarity such as to counteract the "washout" effect of said circuit.

7. The system of claim 4 wherein said means for converting said mechanical signal in accordance with wind direction comprises a function generator for varying the amplitude of the signal as a function of wind vane position.

8. The system of claim 4 wherein said amplifier-washout circuit means comprises a first amplifier and a second amplifier operating as a Miller integrator, said second amplifier having an effective time constant which is comparatively long and being connected to provide negative feedback from the output of said first amplifier to the input thereof.

9. A sailboat steering indicator system comprising:
a wind vane for sensing the apparent wind direction relative to boat heading and providing a mechanical signal in accordance therewith,
means for converting said mechanical signal to an electrical signal comprising a synchro transmitter coupled to the wind vane and a synchro control transformer coupled to the synchro transmitter, said control transformer receiving a mechanical negative feedback signal from said means for converting the output of said summing means to a mechanical signal,
means for generating an electrical signal in accordance with changes in boat rudder position from its neutral position,
means for summing said electrical signals in opposite polarity relationship, and
means for providing a wind track reading in accordance with the output of said summing means for use in guiding the steering of said sailboat to a desired heading relative to wind direction including means for converting the output of the summing means to a mechanical signal and indicator means responsive to said mechanical signal.

10. The system of claim 9 wherein said means for converting the mechanical signal in accordance with wind direction to an electrical signal additionally comprises a function generator for varying the amplitude of said signal as a function of wind vane position.

11. A sailboat steering indicator system comprising:
means for sensing the apparent wind direction relative to boat heading and providing a mechanical signal in accordance therewith,
means for converting said mechanical signal to an electrical signal,
means for generating an electrical signal in accordance with changes in boat rudder position from its neutral position, comprising transducer means coupled to the rudder for generating an electrical signal in accordance with departures of the rudder from its center position and amplifier-washout circuit means for amplifying the electrical signal and washing out steady state components thereof,
means for summing said electrical signals in opposite polarity relationship, and
means for providing a wind track reading in accordance with the output of said summing means for use in guiding the steering of said sailboat to a desired heading relative to wind direction.

12. The system of claim 11 wherein said amplifier-washout circuit means comprises a first amplifier and a second amplifier operating as a Miller integrator, said second amplifier having an effective time constant which is comparatively long and being connected to provide negative feedback from the output of said first amplifier to the input thereof.

13. A sailboat steering indicator system comprising:
a wind vane for sensing the apparent wind direction relative to boat heading and providing a mechanical signal in accordance therewith,
means for converting said mechanical signal to an electrical signal,
means for generating an electrical signal in accordance with changes in boat rudder position from its neutral position,
means for summing said electrical signals in opposite polarity relationship, and
means for providing a wind track reading in accordance with the output of said summing means for use in guiding the steering of said sailboat to a desired heading relative to wind direction, including means for converting the output of said summing means to a mechanical signal and indicator means responsive to said mechanical signal, said converting means comprising a motor driven by the output of the summing means, said indicator means including a first dial portion and first pointer for indicating all apparent wind directions and a second dial portion and second pointer for indicating apparent wind directions in a predetermined close-haul range, first gear means driven by said motor for driving said first pointer and second gear means driven by said motor for driving said second pointer, whereby said second pointer has a substantially higher rotation than said first pointer for any given rotation of said motor.

* * * * *